Jan. 27, 1925.

C. J. BAUMMER, JR 1,524,501

BUNG

Filed March 10, 1924

INVENTOR
*Charles J. Baummer Jr.*
BY
*H. G. Manning*
ATTORNEY

Patented Jan. 27, 1925.

1,524,501

UNITED STATES PATENT OFFICE.

CHARLES J. BAUMMER, JR., OF NAUGATUCK, CONNECTICUT.

BUNG.

Application filed March 10, 1924. Serial No. 697,986.

*To all whom it may concern:*

Be it known that I, CHARLES J. BAUMMER, Jr., a citizen of the United States, and a resident of Naugatuck, county of New Haven, and State of Connecticut, have invented certain new and useful Improvements in Bungs, of which the following is a specification.

This invention relates to a bung or vent for barrels containing fermenting liquids, and more particularly to a bung for automatically permitting gases to escape from such a barrel and at the same time to prevent the entrance of atmospheric air into the barrel.

One object of this invention is to provide a bung of the above nature which will be simple, inexpensive to manufacture, easy to install, and very efficient and durable in use.

With these and other objects in view, there has been illustrated on the accompanying drawing one form in which the invention may be conveniently embodied in practice.

Figure 1:
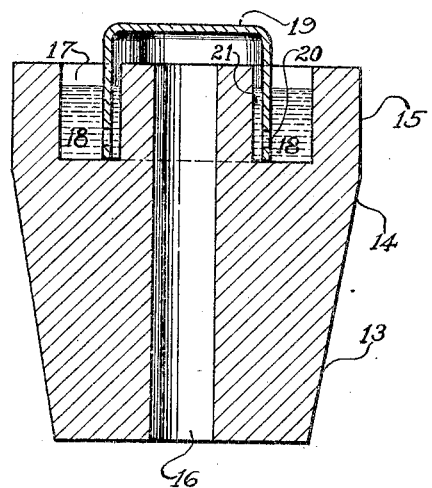
Fig. 1 represents a longitudinal sectional view of the bung.
Figure 2:
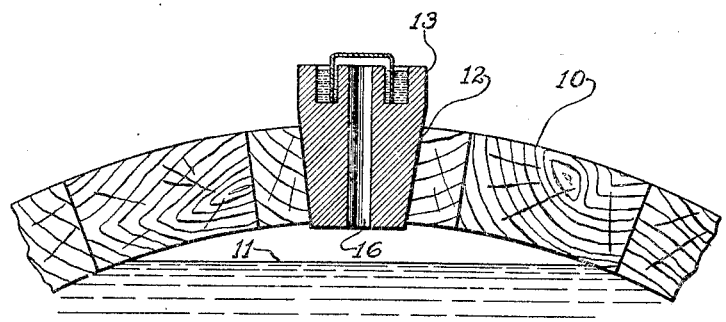
Fig. 2 is a transverse sectional view of the top portion of a barrel containing fermenting liquid, showing the bung in operating position.

In the manufacture of wines and beer, the fermentation takes place in two distinct stages. In the first stage, or "working" stage, carbon dioxide gas is evolved quite rapidly causing a thick foam to form on the surface of the liquid. After the "working" period, there is a second and much longer stage known as "ageing" during which there is a slow fermentation and in which carbon dioxide gas is evolved at a very slow rate.

During the first stage, the evolution of gas is so rapid that the bung may be left out of position without danger of air coming into contact with the fermenting liquid. During the second stage, however, it has been found necessary to hermetically seal the barrel in order to keep out the atmospheric air, which often contains injurious bacteria which would be likely to cause the liquid to become "sour" or otherwise interfere with the fermentation process.

In the ordinary method of ageing wines and beer in a barrel, it has been customary during the second stage to seal the barrel with a solid bung, and to relieve the pressure periodically by removing the bung from the bung hole. This practice, however, is subject to the disadvantage that the person in charge may forget to relieve the pressure which would then rise to such a point that it would blow out the bung, and permit the entrance of bacteria-laden air.

By means of the present invention, the above and other disadvantages have been avoided by employing a bung having a liquid seal embodied therein.

The present invention relates to a bung for use in the second stage of the fermentation for permitting the pressure inside the barrel to automatically relieve itself without allowing the entrance of air.

Referring now to the drawings in which like reference numerals denote corresponding parts throughout the several views, the numeral 10 indicates a barrel filled with fermenting liquid to the level indicated by 11. Midway between its heads, not shown, the barrel 10 is provided with a circular aperture or bung hole 12, which is preferably located at the highest point of said barrel when the latter is lying on its side.

The bung hole 12 is adapted to be sealed or closed by a bung 13 of wood or other suitable material. The lower portion 14 of the bung 13 is frusto-conical in shape so as to permit the bung to be driven tightly into the bung hole 12. The upper and outer end 15 of the bung is preferably cylindrical, and concentric with a cylindrical passage 16 provided at the center of the bung.

An open annular channel 17 is provided in the top surface of the bung and is adapted to be filled with any suitable liquid 18, such as water. A cup 19 preferably cylindrical and provided with a series of perforations 20 adjacent the edge of its rim is inverted and seated on the bottom of said channel 17. The diameter of the cup 19 is slightly greater than the inner diameter of the channel 17 so that a space 21 will be left therebetween for the passage of the gases arising through the central passage 16.

In operation, the carbon dioxide gas evolved from the fermenting liquid will pass up through the passage 16 of the bung, down through the annular space 21, through the perforations 20, and will bubble up through the liquid 18.

One advantage of this invention is that the bung operates entirely automatically, eliminating the labor formerly required to relieve the pressure by periodically removing the bung from the barrel.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a bung for sealing wine and beer barrels, a substantially cylindrical body member, said body member having a central passage and being tapered at its lower end to fit in the bung hole of a barrel, said body member also having an open annular channel extending downwardly from the surface thereof concentric with said passage, said annular channel being adapted to contain a suitable sealing liquid, and a sealing cup seated in inverted position in the bottom of said channel, whereby gases in said barrel may escape freely therefrom, but atmospheric air will be prevented from entering the barrel.

2. In a bung for sealing wine and beer barrels, a substantially cylindrical body member, said body member having a central passage and being tapered at its lower end to fit in the bung hole of a barrel, said body member also having an open annular channel extending downwardly from the surface thereof concentric with said passage, said annular channel being adapted to contain a suitable sealing liquid, and an inverted sealing cup seated in the bottom of said channel, said cup being perforated near the edge of its rim, whereby gases in said barrel may escape freely therefrom, but atmospheric air will be prevented from entering the barrel.

3. In a bung for sealing wine and beer barrels, a tubular body member, said body member being cylindrical at its upper end and frusto-conical at its lower end to fit in the bung hole of a barrel and having an open annular channel extending downwardly from its top surface, said annular channel being adapted to contain a suitable sealing liquid, and an inverted sealing cup fitted in the bottom of said channel, whereby gases in said barrel may freely escape therefrom, but atmospheric air will be prevented from entering the barrel.

4. In a bung for sealing wine and beer barrels, a tubular body member tapered at its lower end to fit in the bung hole of a barrel, said body member having an open annular channel extending downwardly into said body member concentric with the axis of said body member, said annular channel being adapted to contain a suitable sealing liquid, and an inverted cylindrical sealing cup having the edge of its rim seated on the bottom of said channel, whereby gases will be permitted to escape, but atmospheric air will be prevented from entering said barrel.

In testimony whereof, I have affixed my signature to this specification.

CHARLES J. BAUMMER, Jr.